US008044105B2

(12) United States Patent
LeBaron et al.

(10) Patent No.: US 8,044,105 B2
(45) Date of Patent: Oct. 25, 2011

(54) WATER-BASED CERAMIC FOAMS SHOWING IMPROVED GEL STRENGTH

(75) Inventors: Peter C. LeBaron, Hope, MI (US); Thomas M. Paquette, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 336 days.

(21) Appl. No.: 12/363,848

(22) Filed: Feb. 2, 2009

(65) Prior Publication Data

US 2009/0197756 A1 Aug. 6, 2009

Related U.S. Application Data

(60) Provisional application No. 61/025,882, filed on Feb. 4, 2008.

(51) Int. Cl.
*C09K 3/00* (2006.01)
*B01F 3/04* (2006.01)

(52) U.S. Cl. .............................. 516/10; 501/80; 501/84

(58) Field of Classification Search .................... 516/10; 501/80, 84
See application file for complete search history.

(56) References Cited

U.S. PATENT DOCUMENTS

| | | | | |
|---|---|---|---|---|
| 5,512,169 | A * | 4/1996 | Williams | 210/198.2 |
| 2004/0117015 | A1 * | 6/2004 | Biscup | 623/16.11 |

FOREIGN PATENT DOCUMENTS

| | | |
|---|---|---|
| GB | 2317887 | 4/1998 |
| WO | WO 95/30641 | 11/1995 |

OTHER PUBLICATIONS

"Oligomers of Human Serum Modified by Glutaraldehyde", Chemistry of Natural Compounds, Dec. 2004.

* cited by examiner

*Primary Examiner* — Ling Choi
*Assistant Examiner* — Chun-Cheng Wang

(57) ABSTRACT

A method of preparing a gelled ceramic-based foam comprising forming a slurry comprising at least water, a ceramic, albumin and an aldehyde, such that the ratio of the aldehyde to the albumin is from about 60:1 to about 200:1, and frothing the slurry, such that the albumin polymerizes to form a gelled ceramic-based foam. The foam shows improved capability to resist collapse during any subsequent handling, drying to greenware, or firing steps. This enables simplified and more economical production of highly porous ceramics.

19 Claims, No Drawings

WATER-BASED CERAMIC FOAMS SHOWING IMPROVED GEL STRENGTH

BACKGROUND OF THE INVENTION

1. Technical Field

This invention relates to the field of ceramic-based foams. More particularly, it relates to a method of obtaining ceramic-based foams that exhibit improved gel strength in the pre-fired green state.

2. Background of the Art

Porous refractory materials are in demand for a wide variety of industrial and consumer applications. These include, for example, catalyst supports, flame supports, gas filters, air fresheners, ceramic armor, diesel particulate traps, insulation materials, artificial parts for the body such as heart stents, metal filters, reusable filters, liquid filters, storage and transportation for flammable and/or toxic materials, humidity sensors, chromatography, filter candles for filtration of hot combustion gases, diaphragms, membranes, refractory separators, phase dividers, and electrolytes for high temperature fuel cells. Methods to make such porous refractory materials generally include formation of a foam of some type, wherein gas is introduced into or generated within a slurry or dispersion, allowed or induced to expand therein, and the slurry or dispersion material then forms an interconnected porous structure. This structure is then allowed to dry, harden and/or cure, such that the porous refractory material becomes useful.

For example, in WO95/30641 (PCT/GB95/01063), a method of making a porous refractory article is described. That method comprises the steps of forming an aqueous dispersion of refractory particles including a polymerizable monomer component which on polymerization generates an exotherm; adding a thermally-activated gas generating substance; and adding agents such as initiator and/or catalyst to facilitate the polymerization. The gas forms bubbles under the heat of the exotherm, and an interconnected open pore structure results.

In another method, described in GB 2 317 887 A, a porous article composed of bonded particles, such as hydroxyapatite or the like, is formed, beginning with a dispersion comprising a liquid carrier, a polymerizable monomer, and the particles. Thus, the polymeric portions of the porous structure include the particles bonded therein.

A problem that is encountered in many methods that involve formation of an initial foam, however, is that the foam is relatively fragile, and may tend to collapse easily during the period between its initial formation and its final form. This is encountered particularly in the case where the initial slurry or dispersion is water-based. This is because, by definition, most methods require at least some drying of the foam, and this loss of water changes the dynamics of the foam, leading to its collapse. Because of this problem, water-based foams often require special types of handling and further processing, which may add to the expense and difficulty of producing them.

In view of the special difficulties encountered in preparing water-based porous refractory articles, it is desired in the art to find new and improved methods of preparing these foams wherein the capability of the foam to maintain its shape throughout the formation of the final porous article is improved.

SUMMARY OF THE INVENTION

Accordingly, there is provided method of preparing a gelled ceramic-based foam comprising forming a slurry comprising at least water, an albumin, a ceramic, and an aldehyde, such that the ratio of the aldehyde to the albumin is from about 60:1 to about 200:1, and frothing the slurry, such that the albumin polymerizes to form a gelled ceramic-based foam.

In another aspect, there is provided a method of preparing a ceramic-based greenware article comprising forming a slurry comprising water, a ceramic, an albumin and an aldehyde, such that the ratio of the aldehyde to the albumin is from about 60:1 to about 200:1; frothing the slurry, such that the albumin polymerizes to form a gelled ceramic-based foam; and drying the foam to form a ceramic-based greenware article.

In yet another aspect, there is provided a ceramic-based gelled foam comprising water, a ceramic, a polymerized albumin and an aldehyde. The gelled foam may be dried and/or calcined or sintered to form a porous ceramic-based article.

DETAILED DESCRIPTION OF THE INVENTION

Surprisingly, it has been found that including both an aldehyde and albumin, within the given ratios, in a ceramic-based aqueous slurry results in formation of an albumin-based polymer that exhibits an improved level of gel strength once the slurry has been frothed to form a foam. As used herein, the terms "gel" and "gels" refer to colloidal systems in which a porous network of interconnected nanoparticles spans the volume of a liquid medium. In general, gels appear as solid, jelly-like materials. Both by weight and volume, gels are mostly liquid in composition and thus exhibit densities similar to liquids, yet have the structural coherence of a solid. Consequently, the terms "gelled" and "gelation" refer to the accomplishment or production of such a system. In the present invention the improved gel strength allows for wet-casting of the foam, and for employment of other article formation methods wherein improved handling is needed or desired.

Such ceramic-based slurries are desirably aqueous. While the method of the invention may be employed in formation of any refractory material, the method is particularly advantageous in cases where the material begins as an aqueous slurry. The included water is desirably deionized or distilled prior to employment in the slurry, in order to reduce the possibility of undesirable side reactions with any trace impurities such as may be present in industrial or commercial water supplies. However, in some non-limiting embodiments, typical municipally-available, potable water may be employed. In other non-limiting embodiments, water containing a relatively small amount of sodium chloride, less than about 5 percent by weight, such as seawater, may be employed.

Among the key components in the slurry are the constituents of the ceramic. The ceramic may be in particulate form; already in gel form, for example, as a hydrated oxide, such as a xerogel; in solution form; or in any other initial form that may be suitable for preparing a gelled foam therewith. In certain non-limiting embodiments, any non-ferrous material comprising oxygen attached to a non-carbonaceous element may be employed as the ceramic. The non-carbonaceous element may be selected from, in one non-limiting embodiment, magnesium, calcium, aluminum, boron, titanium, chromium, thorium, and combinations thereof. For example, mullite (aluminum silicate, $Al_6Si_2O_{13}$) may be selected as the ceramic. The ceramic material may, however, also include incidental iron along with other trace materials and elements. Example starting ceramic gels may include aluminum-based gels, such as alumina monohydrate and mullite gels; boehmite and pseudoboehmite gels; silica gels; titania gels; chromia gels; thoria gels; and gels combining any of the abovelisted gels. Example particulate ceramics may include aluminas, boehmite, pseudoboehmite, silica, titania, chromia, thoria, mullite, combinations thereof, and the like. It is also possible to add two or more selected materials, such as, for example, a non-ferrous material comprising oxygen and, separately, a non-carbonaceous element, to the water, such that they will react in situ to form a desired ceramic.

Where the ceramic constituent(s) is/are in the form of particles, such may have any suitable particle diameter. In certain non-limiting embodiments, such particle diameter may average less than about 5 microns (μm), and, in certain other non-limiting embodiments, at least about 95 percent of the particles have a diameter of less than about 2 μm. Smaller particles are, in general, less likely to settle or sediment. However, particles may, in certain alternative embodiments, be much larger, having diameters in excess of 100 μm. In such cases it may be desirable to ensure that appropriate anti-settling agents are also incorporated into the slurry. In general, the solids content of the aqueous slurry may range from about 10 percent to about 90 percent by weight, and in certain non-limiting embodiments, may range from about 40 percent to about 80 percent by weight.

Another key component in the starting slurry is a polymerizable monomer. Such monomer is important in foam formation, as it provides the initial support for the froth and may also, in certain non-limiting embodiments, act as an anti-settling agent where settling is anticipated. In certain preferred and non-limiting embodiments, albumin may be employed as the monomer. As used herein, "albumin" is defined as referring to any protein having water solubility, that is also moderately soluble in a concentrated salt solution, and that experiences coagulation upon heating (protein denaturation). Such may be obtained from a variety of biological sources, including albumen (egg white); blood (serum albumin); human and animal tissues in general; and the seeds of some plants. The proteins in these sources and others may be isolated using a method such as, for example, enzymatic hydrolysis; coupling of the protein to an oligonucleotide on support media to form a conjugate, followed by separation of the conjugate from the support media; fractionation using ethanol-caprylic acid; and many others. Choice of isolation means and methods are largely dependent upon both the source of the protein and upon the selected protein itself. For convenience, however, suitable albumin monomer may alternatively be purchased in dry or solution form from a variety of commercial sources. Those skilled in the art will be therefore be able to determine suitable means and methods of obtaining albumin for use in the invention. A particular advantage of gel formulations containing albumin is that, due to the tendency of albumin to polymerize in aqueous solution, the formulations are able to gel without loss of water. This is particularly desirable for preparing a gel foam, since loss of water changes froth dynamics and tends to cause partial or complete collapse of the foam.

The final required component in the gel formulation is an aldehyde. As used herein, the term "aldehyde" is defined to mean any compound containing at least one terminal carbonyl (aldehyde) group. Such aldehydes therefore include both monoaldehydes and dialdehydes that, in certain non-limiting embodiments, may have carbon chain lengths ranging from about 1 carbon atom to about 10 carbon atoms, and in other non-limiting embodiments, may range from about 4 carbon atoms to about 10 carbon atoms. In one non-limiting embodiment an aldehyde may be selected from, for example, 3-oxopropanoic acid, cyclohexane-carbaldehyde, and combinations thereof. Based on availability and cost, however, preferred aldehydes may, in some non-limiting embodiments, be simple, short chain aldehydes such as formaldehyde (methanal), acetaldehyde (ethanal), propanal, butanal, pentanal, hexanal, heptanal, octanal, nonanal, decanal, glutaraldehyde (pentane-1,5-dial or pentanedial), and benzaldehyde. In another non-limiting embodiment, the selected aldehyde is glutaraldehyde. The rapid nature of the albumin polymerization upon contact with the aldehyde speeds the slurry-to-gel transformation (and thereby also reduces the occurrence of potential settling problems) by crosslinking the polymerized albumin. It is this crosslinked, polymerized albumin that provides enhanced support to the structure of the foamed gel in its pre-fired green state.

In general it is desirable to combine the components, including the ceramic, the water, the albumin, and the aldehyde, collectively termed a gel formulation, in any way known to those skilled in the art to be efficacious in forming a gelled ceramic slurry, including frothing the slurry. "Frothing," as used herein, is defined as incorporating bubbles into the gel formulation, either by inputting of an efficacious gas or by formation of bubbles in situ as the result of an auxiliary reaction or, in some cases, both. Useful gases include, for example, air, oxygen, nitrogen, carbon dioxide, and any other easily deployed gas that remains substantially inert to the gel formulation's major components (water, albumin, ceramic and aldehyde). Useful gas-producing materials include, for example, carbonates, urethanes, azides, and combinations thereof. The bubbles that are introduced, or that result from an auxiliary reaction that releases a suitable gas in situ, will froth the gel during polymerization and/or before the polymerization of the albumin is completed in the presence of the aldehyde. Thus, both the efficacious gas and the combined reactants that are capable of producing an efficacious gas in situ are referred to herein as "frothing agents." Frothing may be accomplished via simple addition and mixing, or may be accomplished or enhanced by any suitable mechanical means known to those skilled in the art. Such may include, for example, impellers, spargers, bubblers, and the like. The result of such frothing is formation of a foamed gel.

Useful preparation protocols include, for example, in one non-limiting embodiment, combining the major gel formulation components first to form a well-dispersed slurry; then adding the albumin and the aldehyde thereto and mixing while concurrently subjecting the mixture to heat and frothing. In another non-limiting embodiment, all components, except the aldehyde, are first combined and frothed together; the aldehyde is then added; and finally the froth is manipulated in some way, such as by pouring or scooping into a mold, where it then gels in place. In this embodiment the time window during which the manipulation of the froth may take place may be relatively short, e.g., 1 or 2 minutes. In yet another non-limiting embodiment, a lesser amount of aldehyde is added to initiate crosslinking; frothing of the mixture is begun as polymerization progresses; and the remainder of the aldehyde is then added for crosslinking in order to enhance the strength of the foam's structure as the gelation finishes. Those skilled in the art will be aware of other mixing and reaction protocol variations that may be pursued, and/or will be able to easily discern such based on routine experimentation.

The proportions of the components of the gel formulation are, in some embodiments, very important in determining the properties of the final gelled foam. The component that is generally present in greatest proportion is the water. For many purposes the amount of water may range from about 50 percent to about 90 percent, based on the weight of the formulation as a whole. For other purposes the amount of water may range from about 20 percent to about 95 percent, based on the weight of the formulation as a whole.

The amount of the ceramic component, as a whole, may, in some non-limiting embodiments, range from about 10 percent to about 70 percent, based on the weight of the gel formulation. In other non-limiting embodiments, the amount of the ceramic component may range from about 20 percent to about 50 percent, based on the weight of the gel formulation.

The amounts of the albumin and aldehyde are especially important in attaining improved gel foam strength. Proportional to each other, it may be desirable, in certain non-limiting embodiments, that the ratio of the aldehyde to the albumin range from about 60:1 to about 200:1. In other non-limiting embodiments, the ratio may be from about 90:1 to about 110:1. In still other non-limiting embodiments, it may be about 100:1. In some non-limiting embodiments, the amount of the aldehyde and the albumin, combined, may range from about 15 percent to about 30 by weight, based on the gel formulation as a whole. In other non-limiting embodiments, the combined aldehyde and albumin may range from about 10 percent to about 70 percent by weight, based on the gel formulation as a whole.

It is an advantage of the invention that a wide variety of types of ceramics, exhibiting a wide variety of properties in each of their processing states (slurry, froth, gelled foam, greenware, and fired ceramic), may be prepared thereby. This is because a variety of additional components may optionally be included with the components of the basic gel formulation. For example, acids may be used to help to form a three-dimensional network of both physically and chemically bound water with the ceramic component. Diluted acids may be conveniently used for this purpose, and useful choices include mineral and organic acids, Lewis acids, and mixtures thereof. Preferred useful mineral acids may be selected from the group consisting of hydrochloric, nitric, phosphoric, boric, sulfuric, perchloric, hydrobromic, hydroiodic, and mixtures thereof. Preferred useful organic acids include citric, acetic, lactic, mono-chloroacetic, hydroxyacetic, oxalic, and mixtures thereof. Particularly preferred for use herein are the stronger acids, especially mineral acids, since gel formation occurs rapidly therewith. The preferred mineral acid is hydrochloric acid. In general, and up to a point, the stronger the acid, based upon its type or its concentration, the stronger the gel formed therewith.

Those skilled in the art will be aware that addition of a modest amount of a salt, such as sodium chloride, to a gel formulation containing a relatively weak acid may be useful for further enhancing the strength of the gel formed therefrom. Even in the absence of a weak acid, sodium chloride may serve as a useful temperature profile accelerator, by assisting the gel formulation to reach a desired temperature more quickly. Salt may also substantially increase the final equilibrium temperature of the ceramic composition after firing. For such purposes it may be included in a gel formulation in any amount ranging from about 0.1 percent to about 10 percent by volume, and in other embodiments from about 1 percent to about 8 percent. In some non-limiting embodiments it may be particularly desirable for the salt to be fully ionized in order to achieve its maximum effect. Without wishing to be bound by any theory or hypothesis, it is suggested that the sodium ions may become trapped in the gel matrix, wherein they are located in its diffusing plane. Those skilled in the art will therefore understand that, in one non-limiting embodiment, the salt may be first dissolved in the water or in another component of the formulation, such as in an acid or base, prior to the addition of such to the remainder of the gel formulation.

Suitable ceramic gels may also be formed from gel formulations containing one or more alkaline materials. Such gels are frequently referred to as "slaked" gels. Slaked gels may be formed using organic bases, such as urea and triethanolamine, Brönsted-Lowry bases, Lewis bases, inorganic bases, such as ammonium hydroxide, and combinations thereof. Strong bases, such as sodium hydroxide, sodium carbonate, and sodium bicarbonate, may be efficacious in some applications, but because they tend to form a flocculant precipitate, they may also interfere with gel formation. Selection of a suitable alkaline material will desirably take this possibility into account. Those skilled in the art will be generally able to discern efficacious formulations and protocols upon routine experimentation.

Further additional components may also be introduced into the gel formulation. These include, for example, slip agents, pigments, microwave absorbers, dispersants, surfactants, combinations thereof, and the like.

Once the complete gel formulation has been prepared as a slurry and successfully frothed to form a gelled foam, it will typically include a significant proportion of water, generally from about 0.1 percent to about 70 percent by weight. This refers to free and bound water together, and not to later-absorbed moisture. In some gelled foams the amount of bound water may range from about 17 percent to about 60 percent by weight, and in other gelled foams, the amount of water may be much less, in the range of from about 0.1 percent to about 10 percent by weight. However, a hallmark of a ceramic is that, by definition, it requires heat of some kind to form the final product. This heat frequently comes in two steps. The first is typically a drying step, to reduce the amount of free and bound water. This drying step is generally carried out after gel foam formation is complete, and serves to transition the gelled foam into a "greenware" state, i.e., it becomes an unfired ceramic article in its desired net shape.

The drying may be accomplished via any means generally known to those skilled in the art, such as dessicants and/or a low temperature, low humidity environment. For example, use of a drying oven at a temperature ranging from about 70° C. to about 100° C., for a time period ranging from about 4 hours to about 24 hours, may be, in some non-limiting embodiments, efficacious in driving off excess water. For some delicate foams of very high porosity, a slower drying step may be desirable, wherein dehydration under ambient, high humidity or similar conditions is carried out. Drying is continued, in some preferred embodiments, until the amount of water is less than about 5 percent by weight of the gelled foam. In other non-limiting embodiments, the amount of water after drying may range from about 0.1 percent to about 5 percent by weight of the gelled foam.

In general, the gel formulations described hereinabove offer a significantly enhanced range of processing options. Because of the enhanced strength of these formulations in their gelled foam state, the foams may remain undisturbed throughout any subsequent states, thus maintaining both the essential shape and the overall porosity of a final, desired article. This advantage may be particularly sought when it attends a variety of common commercial formation techniques, such as, for example, gel-casting, slip-casting, bulk casting followed by machining to final shape, and cavity-filling blow-casting.

The conversion of greenware to final ceramic article may be accomplished by means of firing. "Firing," as used herein, refers to calcination and/or sintering. In many embodiments, calcination may be preferred. This is because calcination occurs at a temperature that is generally significantly less than the temperature at which the same composition may be sintered. Thus, from a commercial point of view, calcination is more economical. Sintering, in contrast, requires higher temperatures, which are typically more costly. Sintering also suffers the disadvantage of promoting glass flow, which tends to reduce the ceramic article's porosity. Since the purpose of the frothing step is specifically to impart porosity, excessive sintering may therefore be counterproductive. It should be noted that particularly robust gelled foams may, in certain non-limiting embodiments, be able to be directly fired, without fracture, without first being dehydrated to a greenware state.

Regardless of whether the article is to be calcined or sintered, it is desirable that the article be fired at a temperature that is at or above its thermal decomposition temperature. This may serve to effectively decompose any organics and to volatilize substantially all water that may remain in the article. In calcination the ceramic is subjected to a temperature that is typically from about 300° C. to about 2,000° C., depending upon the identity of the gel formulation components and of the desired final composition. Effective sintering temperatures may frequently range from about 900° C. to about 3,000° C. Calcination and/or sintering may be carried out in any of a variety of types of processing equipment, including for example, a shaft furnace, a rotary kiln, a multiple hearth furnace, or a fluidized bed reactor. Those skilled in the art will be aware of means and methods to accomplish the firing without further direction, or will be able to easily discern such upon routine experimentation.

The final result is, in many embodiments, a highly porous ceramic article which is useful for one of a variety of purposes. In some non-limiting embodiments, the final ceramic article may be, for example, a flow-through reactive distillation-type catalyst support; a filter membrane; a refractory separator; a heat and sound insulator; or a skeleton for a structural composite. In certain non-limiting embodiments, the porosity of the ceramic article may range from about 60 percent by volume to about 95 percent by volume, while in other non-limiting embodiments, the porosity may range from about 70 percent by volume to about 90 percent by volume.

The description hereinabove is intended to be general and is not intended to be inclusive of all possible embodiments of the invention. Similarly, the examples hereinbelow are provided to be illustrative only and are not intended to define or limit the invention in any way. Those skilled in the art will be fully aware that other embodiments within the scope of the claims will be apparent, from consideration of the specification and/or practice of the invention as disclosed herein. Such other embodiments may include selections of specific ceramics, polymerizable albumin monomers, and aldehydes; identification and proportions of components at each process step; mixing and reaction conditions, vessels, and protocols; applications of the final products; and the like; and those skilled in the art will recognize that such may be varied within the scope of the claims appended hereto.

EXAMPLE

Example 1

About 200 g of a standard mullite formulation (36.2 percent kaolin, 45.5 percent of a transition alumina, 15.5 percent of Todd Dark ball clay, 2.3 percent talc, and 0.47 percent $Fe_2O_3$) is mixed with 300 g water, 20 g of METHOCEL™ (A4M), 2 g nonionic surfactant (a common consumer dishwashing product), and 100 g commercial albumin. (METHOCEL™ is a tradename of The Dow Chemical Company.) The slurry is homogenized, and then frothed in a Kitchen Aid mixer set on the "highest" setting (about 220 revolutions per minute, rpm) for 15 minutes. The froth is then scooped and poured into a mold, and about 1 g of glutaraldehyde is added and mixed for 15 seconds. After about 5 minutes the foam gels into a non-collapsing, set state without any loss of water. The wet-set foam is then dried to a greenware state and the greenware article is subsequently calcined at 1,000° C., to remove organics and to sinter at least a portion of the ceramic particles. The resulting article is a ceramic skeleton that retains the shape of the original froth, and exhibits from about 80 percent to about 98 percent, by volume, porosity.

What is claimed is:

1. A method of preparing a gelled ceramic-based foam comprising forming a slurry comprising at least water, an albumin, a ceramic, and an aldehyde, such that the weight: weight ratio of the aldehyde to the albumin is from about 60:1 to about 200:1, and frothing the slurry, such that the albumin polymerizes to form a gelled ceramic-based foam.

2. The method of claim 1 wherein the weight:weight ratio of the aldehyde to the albumin is from about 90:1 to about 110:1.

3. The method of claim 1 wherein the weight:weight ratio of the aldehyde to the albumin is about 100:1.

4. The method of claim 1 wherein the aldehyde is selected from the group consisting of monoaldehydes and dialdehydes having a carbon chain of from about 1 to about 10 carbon atoms.

5. The method of claim 4 wherein the aldehyde is selected from the group consisting of formaldehyde, acetaldehyde, propanal, butanal, pentanal, hexanal, heptanal, octanal, nonanal, decanal, glutaraldehyde, benzaldehyde, 3-oxo-propanoic acid, cyclohexanecarbaldehyde, and combinations thereof.

6. The method of claim 5 wherein the aldehyde is glutaraldehyde.

7. The method of claim 1 wherein the ceramic comprises a non-ferrous material comprising oxygen attached to a non-carbonaceous element selected from the group consisting of magnesium, calcium, aluminum, boron, titanium, chromium, thorium, and combinations thereof.

8. The method of claim 1 wherein the ceramic is selected from the group consisting of alumina, boehmite, pseudoboehmite, silica, titania, chromia, thoria, mullite, and combinations thereof.

9. The method of claim 1 further comprising drying the gelled ceramic-based foam to form a ceramic-based greenware article.

10. The method of claim 9 further comprising firing the ceramic-based greenware article to form a calcined or sintered ceramic article.

11. A method of preparing a ceramic-based greenware article comprising forming a slurry comprising water, a ceramic, an albumin and an aldehyde, such that the weight: weight ratio of the aldehyde to the albumin is from about 60:1 to about 200:1; frothing the slurry, such that the albumin polymerizes to form a gelled ceramic-based foam; and drying the foam to form a ceramic-based greenware article.

12. The method of claim 11 wherein the weight:weight ratio of the aldehyde to the albumin is from about 90:1 to about 110:1.

13. The method of claim 12 wherein the ratio of the aldehyde to the albumin is about 100:1.

14. The method of claim 11 wherein the slurry is frothed by introducing therein a frothing agent selected from the group consisting of a gas selected from the group consisting of air, oxygen, nitrogen, carbon dioxide, and combinations thereof;

a gas-producing material selected from the group consisting of carbonates, urethanes, azides, and combinations thereof; and combinations thereof.

15. The method of claim 11 wherein the gelled ceramic-based foam is dried at a temperature ranging from about 70° C. to about 100° C. to form the ceramic-based greenware article.

16. The method of claim 15 wherein the ceramic-based greenware article contains water in an amount from about 0.1 percent to about 10 percent by weight.

17. The method of claim 11 further comprising firing the ceramic-based greenware article to form a calcined or sintered ceramic article.

18. The method of claim 17 wherein the firing is carried out at a temperature ranging from about 300° C. to about 2,000° C.

19. A ceramic-based gelled foam composition comprising water, a ceramic, a polymerized albumin and an aldehyde, wherein the ceramic-based gelled foam having a porosity ranging from about 60 percent by volume to about 95 percent by volume.

* * * * *